(12) United States Patent
Nascetti et al.

(10) Patent No.: US 7,483,515 B2
(45) Date of Patent: Jan. 27, 2009

(54) DETECTOR FOR THE DETECTION OF X-RADIATION

(75) Inventors: Augusto Nascetti, Aachen (DE); Michael Overdick, Langerwehe (DE); Matthias Simon, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 147 days.

(21) Appl. No.: 10/558,722

(22) PCT Filed: May 26, 2004

(86) PCT No.: PCT/IB2004/050775

§ 371 (c)(1),
(2), (4) Date: Nov. 30, 2005

(87) PCT Pub. No.: WO2004/110056

PCT Pub. Date: Dec. 16, 2004

(65) Prior Publication Data

US 2006/0239407 A1    Oct. 26, 2006

(30) Foreign Application Priority Data

Jun. 5, 2003  (EP) .................................. 03101643

(51) Int. Cl.
  *H05G 1/64*   (2006.01)
  *H01L 27/146*  (2006.01)
(52) U.S. Cl. .................................. 378/98.8; 250/370.09
(58) Field of Classification Search ................ 378/98.8; 250/370.09
See application file for complete search history.

(56) References Cited

U.S. PATENT DOCUMENTS

| 5,452,338 | A  | * | 9/1995  | Granfors et al. ........... 378/98.11 |
| 5,530,238 | A  | * | 6/1996  | Meulenbrugge et al. .  250/208.1 |
| 5,559,849 | A  |   | 9/1996  | Bruijns |
| 5,909,478 | A  | * | 6/1999  | Polichar et al. ............ 378/98.2 |
| 6,028,913 | A  | * | 2/2000  | Meulenbrugge et al. ... 378/98.8 |
| 6,222,901 | B1 |   | 4/2001  | Meulenbrugge et al. |
| 6,459,765 | B1 | * | 10/2002 | Ganin et al. ................. 378/108 |
| 6,760,405 | B2 | * | 7/2004  | Ruetten et al. ............. 378/98.8 |
| 7,076,023 | B2 | * | 7/2006  | Ghelmansarai et al. ....... 378/65 |
| 2002/0064254 | A1 | | 5/2002  | Aoki et al. |
| 2002/0125438 | A1 | | 9/2002  | Pyyhtia et al. |
| 2003/0002624 | A1 | | 1/2003  | Rinaldi et al. |

FOREIGN PATENT DOCUMENTS

| WO |    9948286   A2 | 9/1999 |
| WO | WO 00/70864     | 11/2000 |
| WO | WO 01/57554 A2  | 8/2001 |

\* cited by examiner

*Primary Examiner*—Edward J Glick
*Assistant Examiner*—Thomas R Artman

(57) ABSTRACT

The invention relates to a detector and a method for the production of consecutive X-ray images. This involves the generation in the detector by X-radiation during an exposure interval ($T_{exp}$) of a current flow ($I(t)$) which is integrated ($Q_{dk}^*$, $Q_{sig}^*$, $Q_{ac}^*$) in a memory capacity and read out in a subsequent readout phase ($T_{rd}$). In order to minimize the influence of slowly decaying residual currents ($I_{ac}$), the current ($I(t)$) is integrated only during the exposure interval ($T_{exp}$). By this means, disturbing artifacts due to residual signals from earlier photographs are minimized.

16 Claims, 4 Drawing Sheets

DETECTOR FOR THE DETECTION OF X-RADIATION

The invention relates to a detector for the detection of electromagnetic radiation in an exposure interval, in particular of X-radiation. It also relates to an X-ray apparatus with such a detector, and to a method for the detection of electromagnetic radiation, in particular of X-radiation Used for the detection of X-radiation, are detectors with a conversion element which converts absorbed X-ray quanta into an electrical signal. Typically the electrical signal involves released electrical charge carriers (e.g. electron-hole pairs) which are integrated in a memory capacity by an assigned sensor (pixel). On completion of exposure of the conversion element, the charges contained in the memory capacities are read out by readout electronics and used for the point-by-point composition of an X-ray image. Here the integration of the electrical signal from the conversion element takes place during the exposure interval and subsequent readout phase.

With the detectors described above, due to delay in readout of electrical charge carriers from the conversion elements, a residual signal occurs during subsequent photographs, so that the latter contain disturbing artifacts (e.g. ghost images). In order to reduce such disturbances, U.S. Pat. No. 6,222,901 B1 proposes a detector with a correction unit which determines the dark current directly before fresh exposure of an X-ray detector and subtracts its value from the subsequent signals measured under an exposure. Here the subtracted dark current covers the residual signals of earlier exposure periods. The problem however is that the residual signals referred to are not constant during the subsequent photograph, so that the subtraction of a constant value permits only inaccurate compensation for the residual signals.

Against this background, the problem of the present invention was to provide means of detecting electromagnetic radiation, such as in particular X-radiation, which would reduce or avoid disturbing artifacts due to residual signals.

This problem is solved by a detector with the features of claim 1, by an X-ray apparatus with the features of claim 7, and by a method with the features of claim 8.

Advantageous Designs are Contained in the Dependent Claims.

The detector according to the invention is used to detect electromagnetic radiation in an exposure interval, while the radiation may involve in particular X-radiation.

The Detector Comprises the Following Components:

a) One or more sensors with a conversion element for the conversion of the electromagnetic radiation to be detected into an electrical signal, and with an integration unit for the integration of said electrical signal over an integration period. Typically the detector has a multiplicity of sensors, arranged matrix-like in an array. The conversion element of the sensor may be set up in particular for the direct or indirect conversion of X-radiation into electrical charge carriers (e.g. electron-hole pairs). In the case of indirect conversion, the X-ray quanta firstly induce in a scintillator the emission of visible light, which is then converted in a photodetector into an electrical signal.

b) A readout circuit for the readout and processing of said integrated electrical signal from the sensor during a readout interval which follows the exposure interval.

c) A control means coupled to the sensor and set up to determine the specified integration period so that it substantially overlaps the exposure interval. Such "substantial" overlapping exists when the exposure interval and the integration period overlap by at least 80% (based on the longer of the intervals). Preferably the integration period has a 100% overlap with the exposure interval, i.e. both intervals have the same starting and finishing point and are therefore coincident. If there is no such coincidence, then the integration period typically ends slightly later than the exposure interval.

Through the matching of exposure interval and integration period, the detector described achieves a noticeable improvement in the information content of the images made, since the element of residual signals from previous photographs in the integrated electrical signal is reduced. For a detailed explanation of this effect, reference is made to the description of the Figures.

The readout circuit of the detector is preferably set up so as to correct a dark value of the electrical signal. The dark value of the electrical signal is to be understood as meaning the magnitude of the electrical signal observed without any detectable irradiation of electromagnetic radiation on the conversion element of the sensor. An electrical signal at the level of the dark value thus occurs even during the exposure interval irrespective of the detectable electromagnetic radiation. So that this element of the electrical signal is not erroneously interpreted as due to radiation, it is deducted from the current electrical signal in the readout circuit. The dark value of the electrical signal used for the memory capacity may be a static value which occurs after an adequately long dimming of the sensors and the decay of all residual signals. The dark value may also however be determined in accordance with U.S. Pat. No. 6,222,901 B1, in each case currently, immediately before a fresh exposure interval, so that in this case it also contains elements of residual signals from previous photographs.

According to a preferred embodiment of the detector, the integration unit of the sensor has a primary memory capacity, connected electrically in parallel to the conversion element, while the conversion element is set up for the conversion of electromagnetic radiation into mobile electrical charge carriers. In this case the primary memory capacity may be charged up, before an exposure interval, with a preset electrical voltage which is discharged during the exposure interval with the aid of the charge carriers generated in the conversion element The discharged quantity of charge here corresponds to the integral of the mobile charges generated in the conversion element.

According to a further feature of the embodiment described above the integration unit contains a further "secondary" memory capacity, which is connected to the primary memory capacity and to the conversion element via a coupling element which may be controlled externally. The coupling element may be in particular a transistor. The connection between the two memory capacities which may be switched externally makes it possible to couple or decouple them alternately, so that charges contained in the primary memory capacity may be taken over by the secondary memory capacity, while the latter may then be decoupled from the primary memory capacity and the conversion element. A suitably designed coupling element may also be used as a charge pump to prevent significant residual charges from remaining in the primary memory capacity. Further variants of a "frame transfer" from the primary to the secondary memory capacity are outlined in the description of the Figures and in the references cited there. Through the secondary memory capacity and the coupling element it is possible to preset as desired the effective integration period during which integration of the available charge carriers in the conversion element takes place.

The invention also relates to an X-ray apparatus for the production of e.g. medical X-ray photographs, containing an X-ray source for the controlled generation of X-radiation and an (X-ray) detector for spatially-resolved detection of the X-radiation. Here the detector is designed in the manner explained above, i.e. it contains one or more sensors with a conversion element and an integration unit, a readout circuit and a control means to determine the integration period relative to the exposure interval. Preferably the detector is developed to conform to the design variants described above. The control means of the detector are coupled to the X-ray source on the one hand and to the sensors of the detector on the other hand, and are set up to control the activity periods of the X-ray source during which it emits X-radiation, and the integration periods of the sensors of the detector in such a way that these periods substantially overlap. In this context a significant overlap means an overlap of at least 80%, and preferably complete coincidence. With the specified X-ray apparatus it is possible to produce a series of consecutive X-ray photographs of improved image quality, since disturbance effects due to residual signals are minimized.

The invention also relates to a method for the detection of electromagnetic radiation, in particular X-radiation, comprising the following steps:

a) The conversion of the radiation to be detected during an exposure interval into an electrical signal. The electrical signal may involve in particular charges released by the radiation or a current flow carried by it.
b) The integration of said electrical signal during an integration period, wherein the integration period substantially overlaps the exposure interval. The overlap is preferably at least 80%, with particular preference being given to complete coincidence of the integration period and the exposure interval.
c) The readout of the electrical signal integrated in accordance with step b) during a readout interval. Preferably the readout interval follows the exposure interval immediately.

The method described may be implemented in particular with the aid of the detector described above, in which case the improved image quality described above is achievable.

The invention is explained below by way of example and with the aid of the Figures. Here, identical reference characters in the Figures stand for the same components or factors.

The following explanation of the invention relates to detectors for the detection of X-radiation, but the invention is not limited to this application. Detectors for X-radiation are used in particular in so-called flat dynamic X-ray detectors (FDXD: Flat Dynamic X-Ray Detector). Here a distinction may be made between directly converting detectors which convert X-ray quanta into an electrical signal in a direct conversion (e.g. from a-Se, PbO, $PbI_2$ or $HgI_2$), and indirectly converting detectors. Directly converting detector elements will be considered below, but without limiting the invention to such elements.

Figure 1:
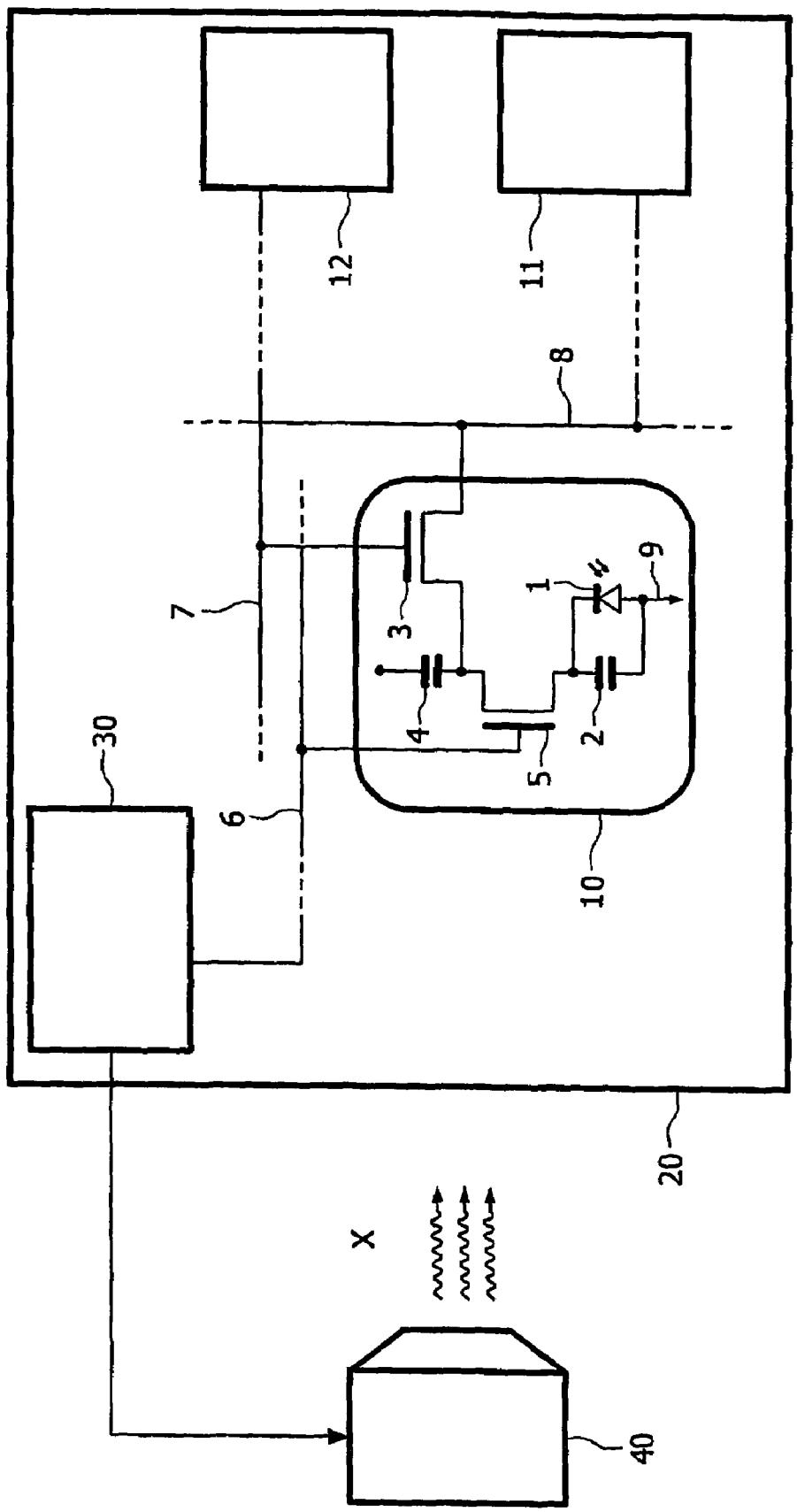
FIG. 1 shows in schematic form an X-ray apparatus according to the invention.

The X-ray apparatus shown schematically in FIG. 1 contains an X-ray source 40 for the generation and emission of X-rays X, together with an X-ray detector 20 for the spatially-resolved detection of the X-radiation X after passage through a body to be examined (not shown). The detector 20 contains a multiplicity of sensors 10 arranged in rows and columns in matrix form; in the Figure only one of these sensors is shown in detail with its internal circuit diagram. The internal structure of this sensor 10 corresponds to an embodiment described in detail in WO 00/70864 A1 and the full content of this document is included by reference in the present application. An alternative embodiment of a detector suitable for the implementation of the present invention is disclosed in WO 01/57554 A2, and its full content is also included by reference in the present application. The electronics of the sensor may be based on a-Si:H, poly-Si or crystalline Si.

The sensor 10 has a conversion element 1 which converts X-radiation directly (or indirectly) into mobile electrical charge carriers (electron-hole pairs). Connected in parallel to the conversion element 1 is a primary memory capacity 2 which, before the start of an exposure interval $T_{exp}$ is charged up to a defined voltage, and may then subsequently be discharged through the conversion element 1, in proportion to the quantity of the charge carriers generated.

The primary memory capacity 2 is connected via a transfer transistor 5 and a switch transistor 3 to a readout line 8 which runs in column form over the detector surface and leads to readout electronics 11 located externally on the edge of the detector chip. The switch transistor 3 may be switched over a control line 7 running in row form over the detector surface, by addressing electronics 12. When both transistors 3 and 5 are conductive, the readout electronics 11 can determine the amount of charge contained in the primary memory capacity 2 and use the information contained therein to produce an X-ray image.

Connected between the two transistors 3 and 5 is one side of a secondary memory capacity 4. By closing or opening of the transfer transistor 5, this may be alternately connected to or disconnected from the primary memory capacity 2 and the conversion element 1. Consequently the integration period, over which the secondary memory capacity 4 integrates a current I(t) in the conversion element 1, may be preset alternately from outside through the transfer transistor 5. At the same time the transfer transistor 5 is preferably also used as a charge pump to prevent any significant residual charges from remaining in the primary memory capacity. Further details and variants of the "frame transfer" from the primary to the secondary memory capacity are to be found in WO 00/70864 A1 and WO 01/57554 A2. Control of the transfer transistor 5 is effected via lines 6 running in row form over the detector surface and leading to a control means 30. The latter are also connected to the X-ray source 40.

Figure 2:
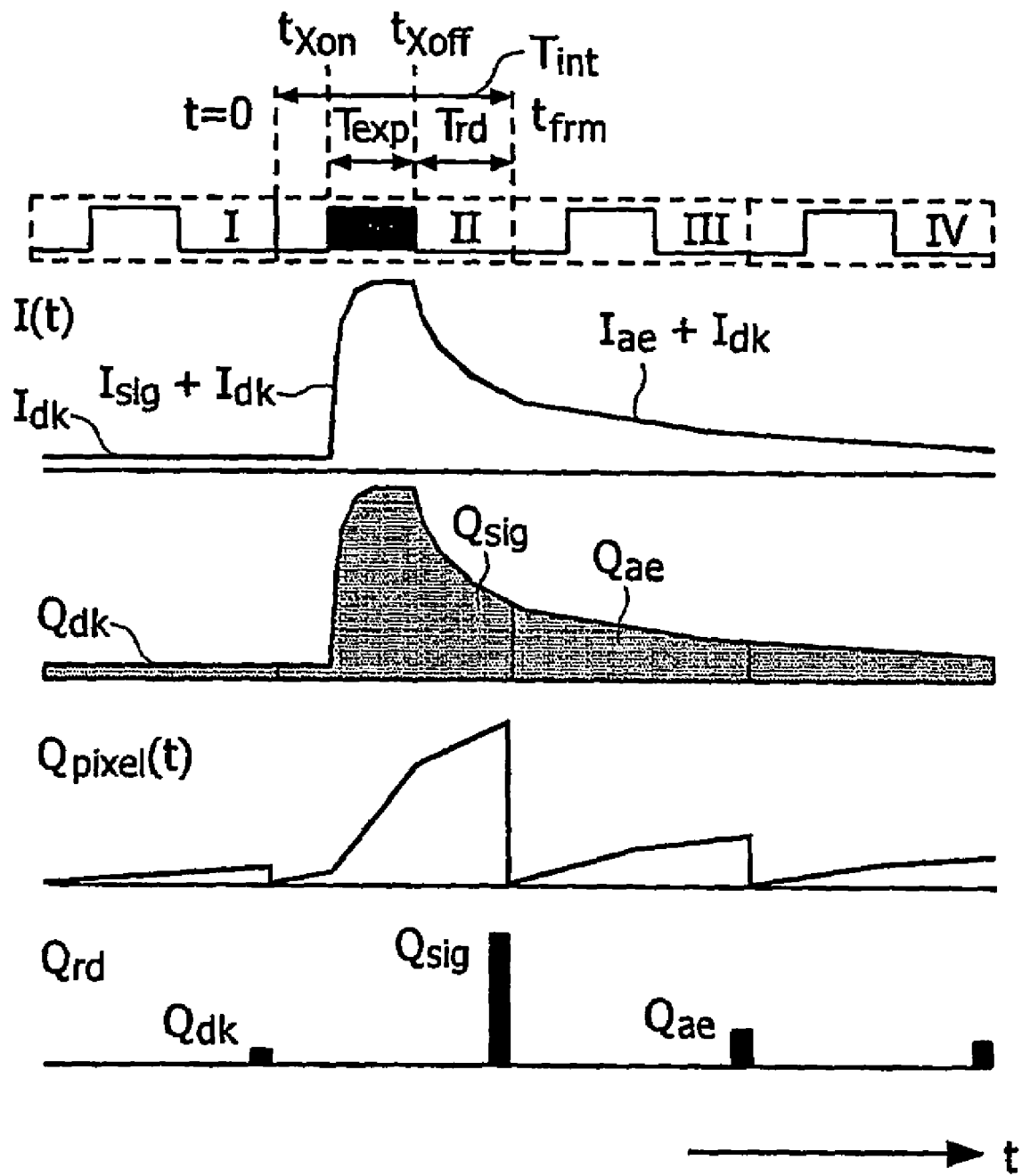
FIG. 2 shows the course over time of the current flow I(t) together with the integrated charge signals Q during the conventional production of a sequence of photographs.

FIG. 2 shows the course over time of different variables in the consecutive production of the X-ray images I, II, III and IV, as it occurs in a method known from the prior art. Only during the second photograph II should X-radiation take place, while the preceding I and the two subsequent photographs III, IV are dark images.

The topmost line of FIG. 2 shows the main instants of time or periods using the example of the second photograph II. Photograph II commences at instant of time t=0 with an electrical resetting of the sensor electronics. At the same time e.g. the primary memory capacities 2 of the detector 20 of FIG. 1 are charged up to a defined voltage. At instant of time $t_{Xon}$, the exposure interval commences; its duration is $T_{exp}$ and it ends at the instant of time $t_{Xoff}=t_{Xon}+T_{exp}$. As mentioned (only) during the second photograph II of FIG. 2 does X-radiation actually take place during the exposure interval. The exposure interval is followed by the readout phase of duration $T_{rd}$. The photograph is complete at instant of time $t_{frm}$, with this instant of time simultaneously representing the start of the following photograph III.

Shown schematically in the second line of FIG. 2 is the course of the current I(t) in the conversion element 1 of FIG. 1. Here it is assumed that before the observed second photograph II an exposure pause has prevailed so that, up to the start of the exposure interval at instant of time $t_{Xon}$, only a small, static and constantly present dark current $I_{dk}$ is flowing. During the exposure interval $T_{exp}$ the current I(t) rises rapidly due to a signal current $I_{sig}$ corresponding to the number of available charge carriers. However, on termination of the exposure at instant of time $t_{Xoff}$, the increased current flow does not end suddenly, but instead fades away relatively slowly due to various delaying factors. This leads to a residual signal current $I_{ae}$ ("after exposure"), which extends beyond the observed second photograph II to the subsequent photographs III, IV, . . . .

In the middle line of FIG. 2, the current curve is shown once again, with the areas covered by it during the individual photograph periods shown hatched. The contents of the areas correspond to the charge signal accumulated in the memory capacities of a sensor by integration. The course over time of the charge accumulation $Q_{pixel}(t)$ is shown in the line below. Finally the last line of FIG. 2 shows the ultimately read-out signal $Q_{rd}$ which is taken from readout electronics of the memory capacity of the sensor element.

In the conventional procedure shown, the sensor of the detector is active for most of the time, i.e. from the instant of time t=0 until the end of the photograph $t_{frm}$. During this time interval the current I(t) flowing in the conversion element of the sensor is integrated and the resultant charge signal is stored in the associated memory capacity. In the example shown, the integration period $T_{int}$ coincides with the duration of the complete photograph, $T_{int}=t_{frm}$, which is the case e.g. for the last pixel of an array. The integration period $T_{int}$ is therefore (distinctly) longer than the exposure interval $T_{exp}$. The resultant amount of charge in the pixel memory capacity is accordingly comprised of various elements: the actual signal current $I_{sig}$, together with the currents flowing before and after the X-ray exposure. Ideally the second contribution corresponds to the dark current $I_{dk}$, and its effect may easily be compensated for by subtraction of a dark image from the image taken.

In the case of real detectors, though, the effects known as residual signals occur, as mentioned earlier, and they can not be corrected by simple subtraction. These effects are based on a slow decay of the sensor current $I_{ae}$ after the end of an X-ray exposure at instant of time $t_{Xoff}$. Expressed in general terms, the sensor current I(t) at a given instant of time t depends on the incident radiation and the previous history of the detector. With reference to the variables shown in FIG. 2, the amount of charge stored in a pixel during (a) a dark image, (o) an exposure image, and (c) a dark image after exposure may be expressed as follows:

$$Q_{dk} = I_{dk} \cdot T_{int} \quad (a)$$

$$Q_{sig} = I_{sig} \cdot T_{exp} + I_{dk} \cdot T_{int} + \int_{t_{Xoff}}^{t_{frm}} I_{ae}(t - t_{Xoff}) \cdot dt \quad (b)$$

$$Q_{ae} = I_{dk} \cdot T_{int} + \int_{t_{frm}}^{t_{frm}+T_{int}} I_{ae}(t - t_{Xoff}) \cdot dt \quad (c)$$

Here, for the sake of simplicity, a constant signal current $I_{sig}$ and dark current $I_{dk}$ have been assumed. After subtraction of the dark signal $Q_{dk}$, the variable R may be defined as the ratio between the accumulated pixel charges in the first photograph after exposure and the accumulated pixel charges during exposure.

$$R = \frac{Q_{ae} - Q_{dk}}{Q_{sig} - Q_{dk}} = \frac{\int_{t_{frm}}^{t_{frm}+T_{int}} I_{ae}(t - t_{Xoff}) \cdot dt}{I_{sig} \cdot T_{exp} + \int_{t_{Xoff}}^{t_{frm}} I_{ae}(t - t_{Xoff}) \cdot dt} =$$

$$\frac{\exp\left(-\frac{t_{frm} - t_{Xoff}}{\tau}\right) \cdot \left(1 - \exp\left(-\frac{T_{int}}{\tau}\right)\right)}{\frac{T_{exp}}{\tau} + 1 - \exp\left(-\frac{t_{frm} - t_{Xoff}}{\tau}\right)}$$

Here an exponential decay of the sensor current on completion of the X-radiation has been assumed, i.e.:

$$I_{ae}(t) = I_{sig} \cdot \exp\left(-\frac{t}{\tau}\right)$$

Since the charge resulting from the build-up of charge after a photograph is integrated over a long period of time, while the immediate exposure signal occurs only during the shorter exposure time $T_{exp}$, the ratio R assumes a relatively high value.

Figure 3:
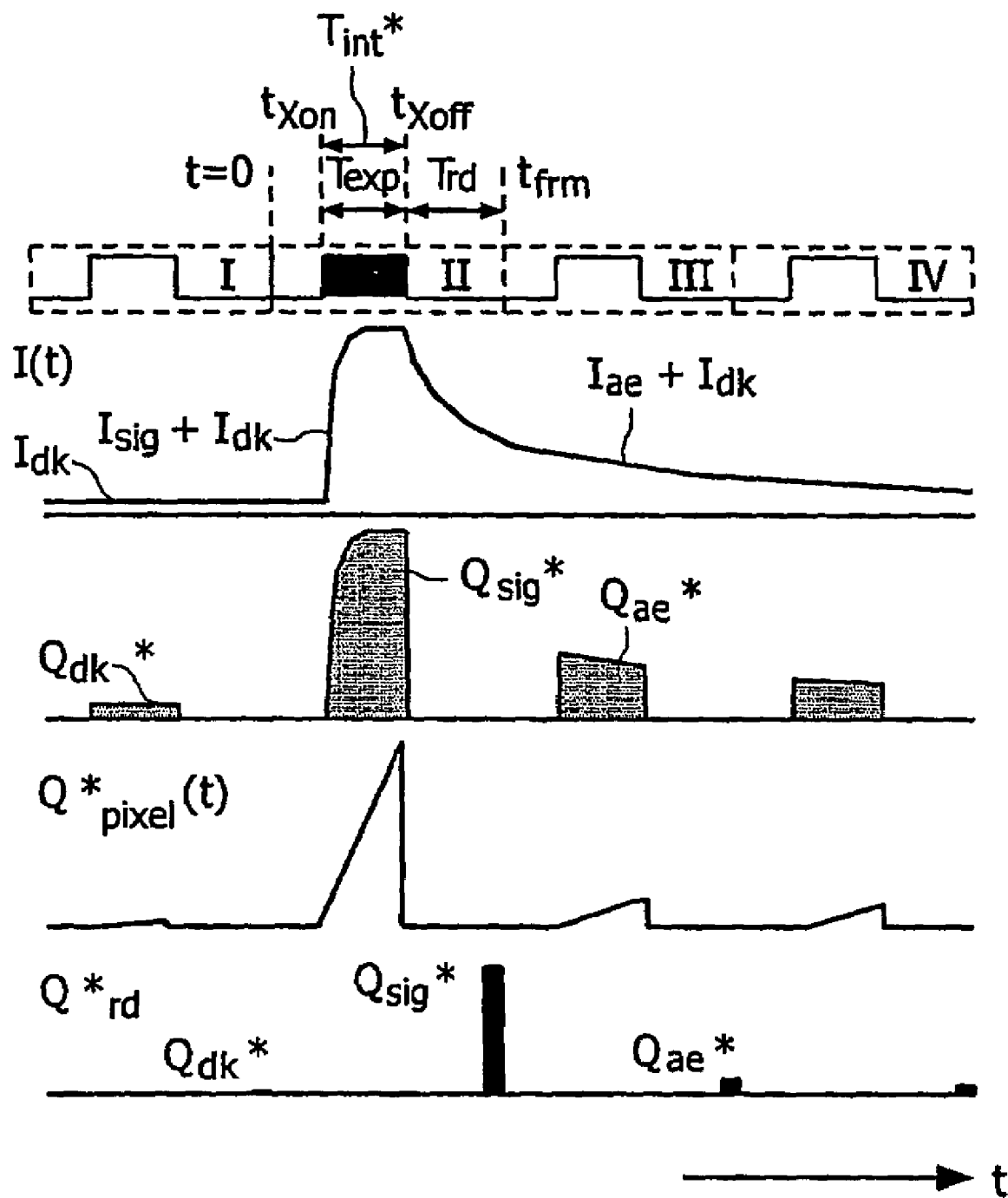
FIG. 3 shows a representation corresponding to FIG. 2 of the production of a sequence of photographs according to the invention.

To reduce the effect of the residual signal coming from the sensor it is proposed according to FIG. 3 to store only the charge generated during the effective exposure time window. In other words the integration time $T_{int}^*$ is made equal to the exposure time $T_{exp}$. Such control of the integration time may be achieved by sensors which implement a "frame transfer" function (see FIG. 1 and e.g. WO 00/70864 A1, WO 01/57554 A2). As the following calculations show, such control of the integration time leads to minimization of the residual signal effects in the X-ray image.

FIG. 3 shows the variables and courses of time in application of the proposed procedure "$T_{int}^*=T_{exp}$" corresponding to FIG. 2. In this case the variables calculated above (for distinction now marked with an asterisk *) read as follows:

$$Q_{dk}^* = I_{dk} \cdot T_{exp} \quad (a)$$

$$Q_{sig}^* = I_{sig} \cdot T_{exp} + I_{dk} \cdot T_{exp} \quad (b)$$

$$Q_{ae}^* = I_{dk} \cdot T_{exp} + \int_{t_{frm}+t_{Xon}}^{t_{frm}+t_{Xoff}} I_{ae}(t - t_{Xoff}) \cdot dt \quad (c)$$

After subtraction of $Q_{dk}^*$, the ratio between the signal after the exposure image and the X-ray signal in the exposure image may be expressed by:

$$R = \frac{Q_{ae}^* - Q_{dk}^*}{Q_{sig}^* - Q_{dk}^*} =$$

$$\frac{\int_{t_{frm}+t_{Xon}}^{t_{frm}+t_{Xoff}} I_{ae}(t - t_{Xoff}) \cdot dt}{I_{sig} \cdot T_{exp}} = \frac{\exp\left(-\frac{t_{frm} - T_{exp}}{\tau}\right) \cdot \left(1 - \exp\left(-\frac{T_{exp}}{\tau}\right)\right)}{\frac{T_{exp}}{\tau}}$$

The above value corresponds to the minimal value which can be obtained for a given sensor material.

Figure 4:
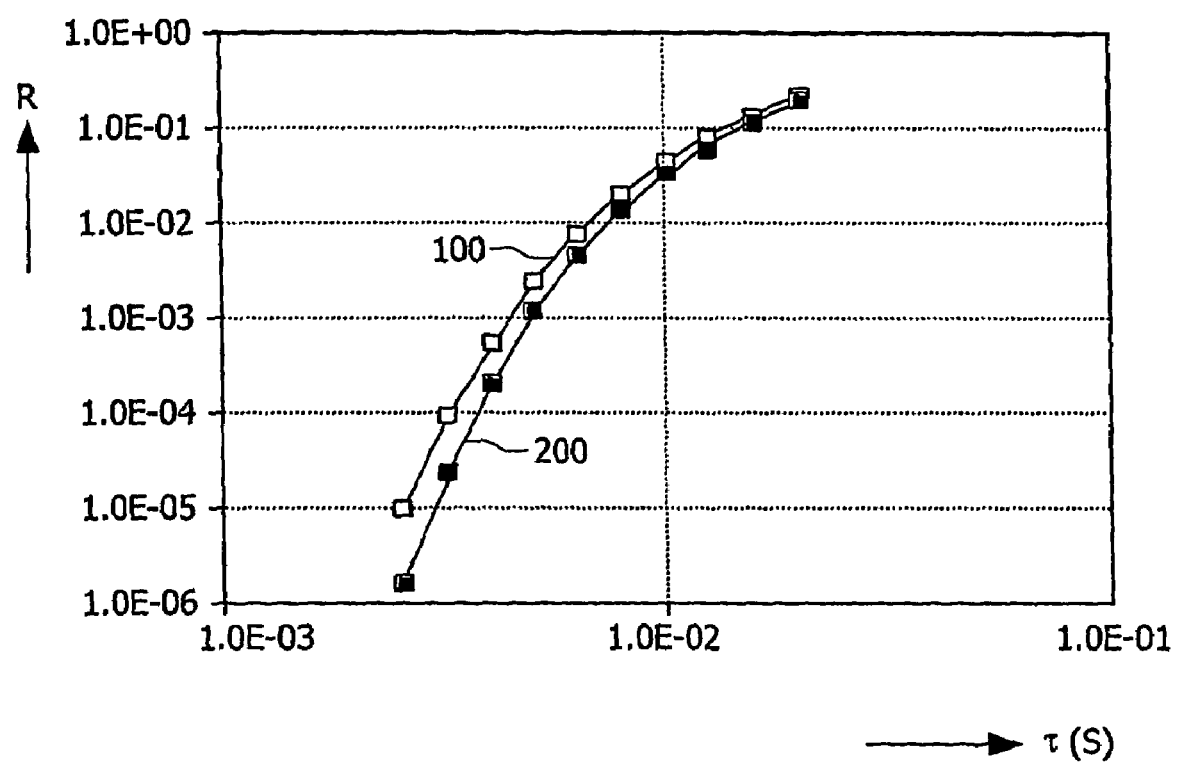
FIG. 4 shows the dependence of a ratio R between the residual signal and the image signal depending on a decay parameter of the residual signal for conventional detectors and detectors according to the invention.

FIG. 4 shows the reduction in the residual signal obtainable using the procedure described, in a presentation of the ratio value R defined above (ratio between the pixel charge in the first photograph after an exposure photograph and the accumulated pixel charge in the exposure photograph) compared with the decay time constant τ. Here the upper curve 100 corresponds to a conventional flat dynamic X-ray detector (FDXD), while the lower curve 200 belongs to a detector operated according to the invention. The data presented were obtained on the basis of a photograph duration of 40 ms and an exposure interval $T_{exp}$ of 10 ms, commencing 5 ms after an electrical reset. According to the results shown in FIG. 4, the residual signal in a photograph after exposure may be reduced from 2% to 1.3% e.g. using a sensor material with a decay time constant of 8 ms.

The invention claimed is:

1. A detector (20) for the detection of X-radiation (X), in an exposure interval ($T_{exp}$), comprising:
   a) one or more sensors (10) with a conversion element (1) for the conversion of X-radiation (X) into an electrical signal (I(t)), and with an integration unit (2, 4) for the integration of the electrical signal over a specified integration period ($T_{int}^*$);
   b) a readout circuit (11, 12) for the readout and processing of the integrated electrical signal ($Q_{dk}^*$, $Q_{sig}^*$, $Q_{ac}^*$) from the sensor (10) during a readout interval ($T_{rd}$) which follows the exposure interval ($T_{exp}$); and
   c) a control means (30) coupled to the sensor (10) and set up to determine the specified integration period ($T_{int}^*$) so that the specified integration period ($T_{int}^*$) substantially overlaps the exposure interval ($T_{exp}$),
   wherein the control means (30) are set up so as to make the integration period ($T_{int}^*$) and the exposure interval ($T_{exp}$) substantially coincident,
   wherein the X-radiation (X) is continuous during the exposure interval ($T_{exp}$), and
   wherein the integration unit has a primary memory capacity (2) connected in parallel with the conversion element (1) and a secondary memory capacity (4) which is coupled to the primary memory capacity (2) and to the conversion element (1) via an externally controllable coupling element (5).

2. A detector as claimed in claim 1, wherein the conversion element (1) is set up for the direct or indirect conversion of the X-radiation into electrical charges.

3. An X-ray apparatus comprising an X-ray source (40) and a detector (20) as claimed in claim 1 for the detection of the X-radiation, wherein the control means (30) of the detector are coupled to the X-ray source (40) and the sensors (10) of the detector (20), and are set to control the activity times ($T_{exp}$) of the X-ray source (40) and the integration periods ($T_{int}^*$) of the sensors (10) of the detector (20) so that the activity times ($T_{exp}$) and the integration periods ($T_{int}^*$) substantially overlap.

4. The detector of claim 1, wherein the externally controllable coupling element (5) is a first transistor connected between the primary and secondary memory capacities.

5. The detector of claim 4, wherein a gate of the first transistor is connected to the control means (30).

6. The detector of claim 1, wherein the externally controllable coupling element (5) implements a frame transfer function.

7. The detector of claim 1 wherein the primary memory capacity is charged to a pre-determined voltage prior to the start of the exposure interval ($T_{exp}$), and wherein the primary memory capacity is discharged through the conversion element (1) in proportion to a quantity of charge carriers generated during the specified integration period ($T_{int}^*$).

8. A detector (20) for the detection of X-radiation (X), in an exposure interval ($T_{exp}$), comprising:
   one or more sensors (10) with a conversion element (1) for the conversion of X-radiation (X) into an electrical signal (I(t)), and with an integration unit (2, 4) for the integration of the electrical signal over a specified integration period ($T_{int}^*$);
   a readout circuit (11, 12) for the readout and processing of the integrated electrical signal ($Q_{dk}^*$, $Q_{sig}^*$, $Q_{ac}^*$) from the sensor (10) during a readout interval ($T_{rd}$) which follows the exposure interval ($T_{exp}$); and
   a control means (30) coupled to the sensor (10) and set up to determine the specified integration period ($T_{int}^*$) so that the specified integration period ($T_{int}^*$) substantially overlaps the exposure interval ($T_{exp}$),
   wherein the integration unit has a primary memory capacity (2) connected in parallel with the conversion element (1), wherein the integration unit has a secondary memory capacity (4) which is coupled to the primary memory capacity (2) and to the conversion element (1) via an externally controllable coupling element (5), wherein the externally controllable coupling element (5) is a first transistor connected between the primary and secondary memory capacities, wherein a gate of the first transistor is connected to the control means (30), wherein the readout circuit comprises an addressing device (12) and a readout device (11), wherein the one or more sensors each have a second transistor, wherein a gate of the second transistor is connected to the addressing device, and wherein the second transistor is connected to the readout device and the first transistor.

9. The detector of claim 8, wherein the X-radiation (X) is continuous during the exposure interval ($T_{exp}$).

10. A detector as claimed in claim 8, wherein the control means (30) are set up so as to make the integration period ($T_{int}^*$) and the exposure interval ($T_{exp}$) substantially coincident.

11. A detector as claimed in claim 8, wherein the readout circuit (11) is set up so as to compensate for a dark value ($I_{dk}$) of the electrical signal (I(t)).

12. A method for the detection of X-radiation (X), comprising the steps:
   generating the X-radiation during an exposure interval ($T_{exp}$);
   conversion of the X-radiation during the exposure interval ($T_{int}^*$) into an electrical signal (I(t));
   integration of the electrical signal (I(t)) during an integration period ($T_{int}^*$) which substantially overlaps the exposure interval ($T_{exp}$); and
   readout of the integrated electrical signal ($Q_{dk}^*$, $Q_{sig}^*$, $Q_{ac}^*$) during a readout interval ($T_{rd}$),
   the integration being performed using an externally controllable coupling element (5) comprising a first transistor connected between primary and secondary memory capacities, the first transistor having a gate connected to a control means (30) that determines the integration period ($T_{int}*$), the readout being performed using an addressing device (12) and a readout device (11) that are each connected to a second transistor, and wherein the second transistor is connected to the first transistor.

13. The method of claim 12, further comprising performing the integration using a frame transfer function.

14. The method of claim 12, further comprising generating the X-radiation during the exposure interval ($T_{exp}$) continuously.

15. A method as claimed in claim 12, wherein the electrical signal is a current flow ($I(t)$) carried by released charge carriers.

16. A method as claimed in claim 12, wherein the integration period ($T_{int}*$) is substantially coincident with the exposure interval ($T_{exp}$).

* * * * *